United States Patent
Czerwinski et al.

(10) Patent No.: US 7,216,916 B2
(45) Date of Patent: May 15, 2007

(54) FLIPPER PANEL FOR A VEHICLE

(75) Inventors: Kenneth J. Czerwinski, Oxford, MI (US); Seyed R. Hashemizad, Danville, CA (US); James Axiotis, Auburn Hills, MI (US); Mosen Sepasi, Mississauga (CA)

(73) Assignees: General Motors Corporation, Detroit, MI (US); ABC Group, Inc., Toronto, Ontario (CA)

( * ) Notice: Subject to any disclaimer, the term of this patent is extended or adjusted under 35 U.S.C. 154(b) by 390 days.

(21) Appl. No.: 10/913,933

(22) Filed: Aug. 6, 2004

(65) Prior Publication Data

US 2006/0061120 A1    Mar. 23, 2006

(51) Int. Cl.
*B60N 2/04* (2006.01)

(52) U.S. Cl. .................. 296/66; 296/24.44; 296/24.43; 297/396

(58) Field of Classification Search .............. 296/24.3, 296/24.43, 187.08, 193.07, 37.16, 66, 24.44, 296/37.2, 37.14; 297/15, 396
See application file for complete search history.

(56) References Cited

U.S. PATENT DOCUMENTS

| | | | | |
|---|---|---|---|---|
| 3,011,822 A | * | 12/1961 | May et al. ..................... | 296/66 |
| 3,053,565 A | * | 9/1962 | Farrow ........................ | 296/66 |
| 3,328,070 A | * | 6/1967 | Jermain, Jr. ................. | 296/66 |
| 4,270,790 A | | 6/1981 | Curotto .................... | 296/37.16 |
| 4,277,097 A | | 7/1981 | Lalanne ................... | 296/37.16 |
| 4,351,555 A | | 9/1982 | Hashimoto ............... | 296/37.16 |
| 4,848,826 A | * | 7/1989 | Kuwabara et al. ....... | 296/97.23 |
| 5,011,208 A | | 4/1991 | Lewallen ................. | 296/37.16 |
| 5,257,846 A | | 11/1993 | Kanal et al. ............. | 296/37.14 |
| 5,658,046 A | * | 8/1997 | Rus ......................... | 297/378.1 |
| 5,716,091 A | * | 2/1998 | Wieczorek ............... | 296/37.16 |
| 6,113,172 A | * | 9/2000 | Chaloult et al. ......... | 296/26.08 |
| 6,508,499 B1 | | 1/2003 | Guanzon et al. ........... | 296/37.1 |
| 6,698,829 B1 | * | 3/2004 | Freijy et al. ........... | 297/188.09 |
| 6,817,660 B2 | * | 11/2004 | Ito et al. ....................... | 297/15 |
| 2003/0090120 A1 | * | 5/2003 | Barber et al. .............. | 296/37.5 |
| 2003/0116989 A1 | * | 6/2003 | Guanzon et al. ......... | 296/37.16 |

\* cited by examiner

*Primary Examiner*—Jason Morrow
(74) *Attorney, Agent, or Firm*—Laura C. Hargitt

(57) ABSTRACT

A removable flipper panel system for a vehicle includes a rod housing mounted on a seat support member which is movable with respect to a load floor of the vehicle. A load bearing blow-molded hard panel hides the gap which is formed between seat and load floor when the seat moves. The system includes a rod and spring assembly mechanism having a configuration to sustain the panel in adjustable positions between a generally planar position and an upright position. The flipper panel attaches to the seat to provide movement for the panel in the planar position to hide the gap and space between the seat and the load floor and to maximize the cargo area. The attachment of the flipper panel to the seat has a locking feature permitting the flipper panel to be removed easily.

11 Claims, 2 Drawing Sheets

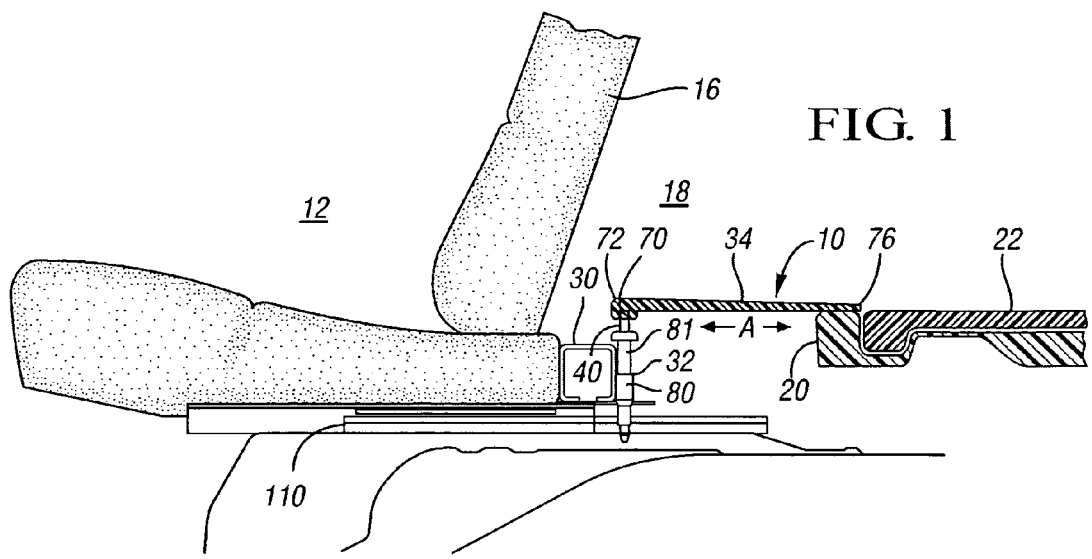
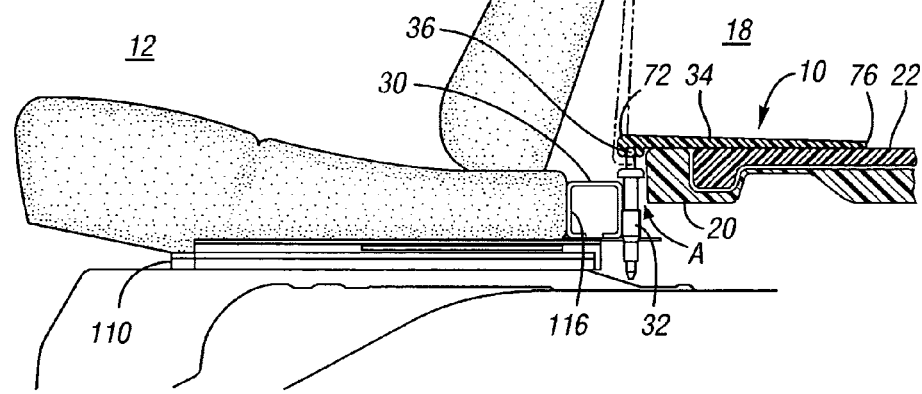
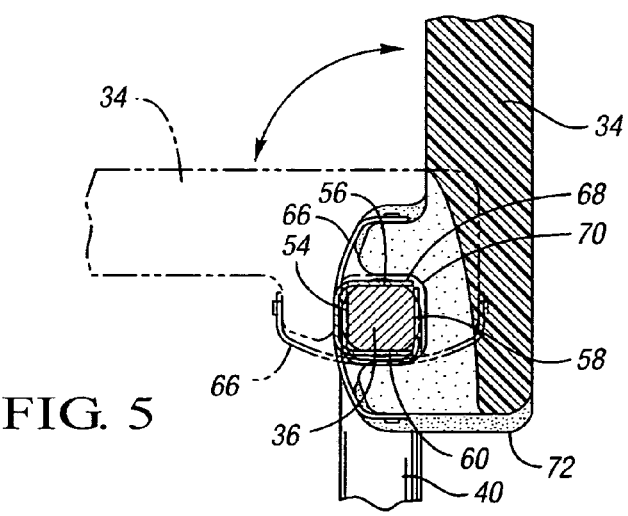

FLIPPER PANEL FOR A VEHICLE

TECHNICAL FIELD

This invention relates to a flipper panel for bridging the gap between a movable vehicle seat and the vehicle fixed load floor.

BACKGROUND OF THE INVENTION

Vehicles have been provided with a rear seat that can be folded down onto the seat cushion or onto the vehicle floor in order to extend the load floor. A gap often occurs between the seat and the load floor. The problem faced by such prior art is solved by bridging the gap. An example of such prior art is U.S. Pat. No. 5,716,091 issued Feb. 10, 1998 to Wieczorek. The problem is made more difficult when the seat is movable in the vehicle fore and aft with respect to the load floor.

It is an object of this invention to solve this problem with an improved flipper panel system.

SUMMARY OF THE INVENTION

This invention relates to a flipper panel system which is adapted for mounting in an interior compartment of a vehicle behind a seat thereof. The vehicle has a load floor, and the flipper panel system has a seat support member movable between forward and rearward gap-forming positions with respect to the load floor and a rod housing which is movable with said seat support member. A flipper panel has a rod. When the flipper panel is in a vehicle, the panel is pivotable with respect to the rod. The rod is insertable into the rod housing for mounting or supporting said panel, and the flipper panel is movable after the rod is inserted for pivotable movement between a bridging cover position covering said gap in both of said gap-forming positions and a storage position adjacent the seat.

The flipper panel system is further adapted for mounting in an interior compartment where the seat has a headrest which mounts in a rod housing that moves with the seat. The rod housing of the flipper panel system has parts common with the rod housing of the headrest so that it may be substantially interchangeable with the rod housing for the headrest.

The rod of the flipper panel system is U-shaped and includes four flat detent surfaces at two locations to accept at each location a U-shaped spring for cooperating selectively with the flat surfaces on the rod to hold the panel in a selected one of the cover and storage positions. The flipper panel in its storage position is upright at an angle predetermined by at least one of the flat surfaces.

The panel of the flipper panel system is a load bearing blow-molded hard panel having a channel in the forward end of the panel to receive a bight portion of the U-shaped rod. The panel, when in its cover position, is higher at its forward end than at its rearward end, whereby to provide a slope to help a load on the load floor to move up on the panel. The panel has outboard wings to increase the gap covering when the panel is pivotably moved to its bridging cover position.

The rod housing is weldable to the seat support member and in cooperation with the rod includes a latch operable to restrain and release the rod and the flipper panel after the rod is inserted into the rod housing.

This invention is also a vehicle with a motor vehicle interior having a rear cargo area flanked by a plurality of side support positions. The rear cargo area has a load floor supportable at a selected one of the support positions. Tracks in the vehicle interior forward of the load floor support a seat which is movable forwardly and rearwardly on the tracks in a gap-changing manner with respect to the load floor when the load floor is in the lowermost support position.

The seat support structure has a mounting tube and a rod retainer bushing movable with the seat support structure and a flipper panel includes a rod pivotable with respect to the panel. The rod is insertable into the rod retainer bushing so that the flipper panel moves forwardly and rearwardly with the seat support structure.

The flipper panel is pivotable on the rod between a discrete upright position adjacent the seat and a lowered position overlaying the load floor when the seat support structure moves forwardly and rearwardly.

The load floor may be formed with blow-molded hollow compartments.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1 is a fragmentary view, partly in elevation and partly in section, of the flipper panel system of this invention in a vehicle having a cargo floor and a passenger seat movably in a forward position with respect to the cargo floor;

FIG. 2 is a fragmentary view of the flipper panel system in FIG. 1 with the passenger seat movably in a rearward position with respect to the cargo floor;

FIG. 5 is a fragmentary cross-section of the pivot rod and flipper panel showing the flat detent surfaces on the pivot rod and a U-shaped spring that cooperate selectively in holding the flipper panel in either a cover position (phantom line) or a storage position (solid line).

DESCRIPTION OF THE PREFERRED EMBODIMENTS

Figure 3:
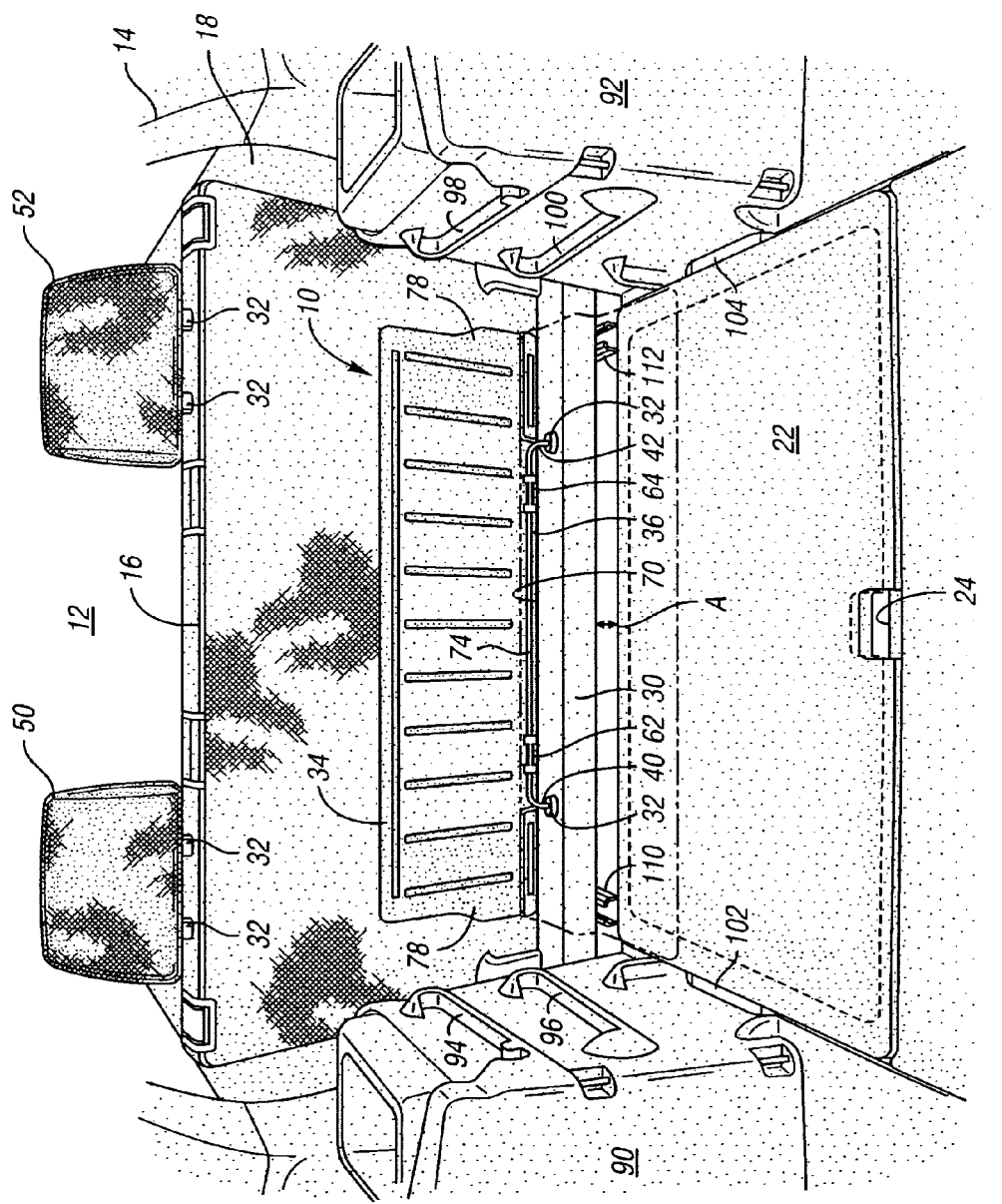
FIG. 3 is a fragmentary perspective view of the cargo floor and the movable passenger seat and headrest with the flipper panel of the flipper panel system in its storage position (solid line) and its bridging cover position (phantom line)

With reference to FIGS. 1–3, this invention relates to a flipper panel system 10 which is adapted for mounting in an interior compartment 12 of a vehicle 14 behind a seat 16 thereof. The interior compartment 12 has a cargo compartment 18 with a bed 20. The bed 20 has a load floor 22. The flipper panel system 10 has a seat support member 30 movable between forward (FIG. 1) and rearward (FIG. 2) gap-forming positions with respect to the cargo bed 20 and the load floor 22 supported thereon. A rod housing 32 is connected to the seat support member and movable with said seat support member. The flipper panel system 10 has a flipper panel 34 and a rod 36 carried in a channel of the panel as shown in FIGS. 1 and 2. The flipper panel rod 36 is pivotable with respect to the panel 34. Each rod end 40, 42 is insertable into a respective rod housing 32 for supporting said panel, and the flipper panel 34 is movable after the rod end is inserted for pivotable movement between bridging cover positions (FIGS. 1 and 2). The flipper panel covers said gap in both of said gap-forming positions. The flipper panel also has a storage position (FIG. 3) adjacent the back of the seat.

Referring to FIG. 3, the flipper panel system 10 is further adapted for mounting in an interior compartment 12 where the seat has headrests 50, 52 which mount in rod housings 32 which are movable with the seat. In general, the rod housings 32 of the flipper panel system have common parts with the rod housings 32 for the headrests 50, 52 so that these housings may be interchangeable, as will be described in more particularity hereinafter.

The rod 36 of the flipper panel system 10 is U-shaped, as shown in FIG. 3, and includes four flat detent surfaces 54, 56, 58, 60 (FIG. 5) at two locations 62, 64 (FIG. 3) to accept at each location a panel spring 66 having U-shaped spring portions 68 for cooperating selectively with the flat surfaces on the rod to hold the panel 34 in a selected one of the cover and storage positions. The flipper panel 34 in its storage position (FIG. 3) is upright at an angle predetermined by at least one of the flat surfaces, such as flat surface 54 in FIG. 5.

The panel 34 of the flipper panel system 10 is a load bearing blow-molded hard panel having a channel 70 in the forward end 72 of the panel to receive a bight portion 74 (FIG. 3) of the U-shaped rod. The panel 34, when in its cover position (FIGS. 1 and 2) is higher at its forward end 72 than at its rearward end 76, whereby to provide a slope to help a load on the load floor to move up on the panel. The higher forward end may be achieved by a wedge-shaped panel or by mounting the forward end of the panel higher in the rod housing. The panel has outboard wings 78 (FIG. 3) to increase the gap covering when the panel is pivotably moved to its bridging cover position.

Figure 4:
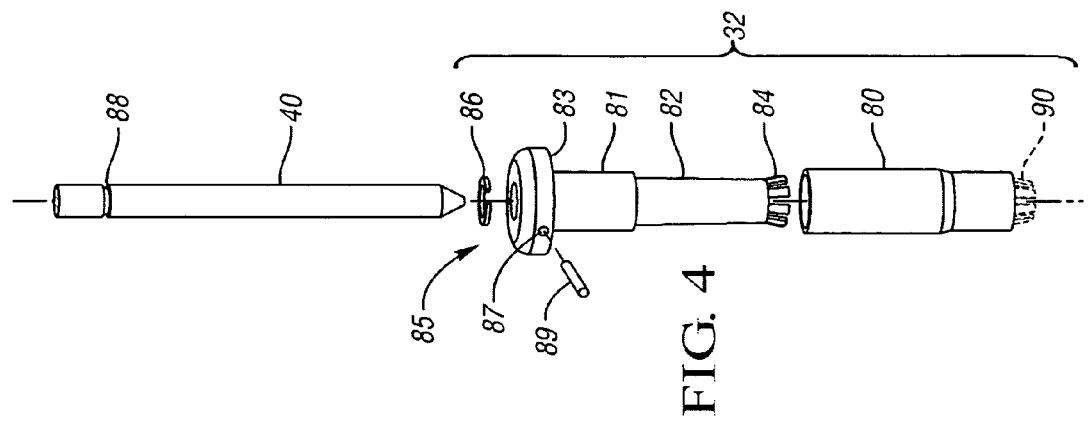
FIG. 4 is an exploded view of a fragmentary end portion of a pivot rod for the flipper panel and a rod housing for insertably receiving the end portion.

More particularly, the rod housing has a metal sleeve portion 80 which is weldable to the seat support member 30 (FIG. 1). The sleeve portion 80 receives a plastic bushing portion 81. The bushing portion 81 includes a stem 82 and a cap 83 that are attached together. Opposite the cap is a flareable end which contracts as the stem is inserted into one end of the sleeve 80. End 84 flares outwardly as it exits the other end of the sleeve to attach the stem to the sleeve, as shown in phantom in position 90 in FIG. 4. In cooperation with the rod end 40, the stem includes a latch 85 operable to restrain and release the rod and the flipper panel from the bushing portion whenever the flipper panel is desired to be removed from the vehicle. For this purpose the latch includes a lock plate and/or spring mechanism shown schematically at 86 which is actuatable by a pin 89 insertable through an opening 87 in the cap 83. The lock plate and spring mechanism 86 have an interfering fit with an annular groove 88 on the rod end 40 which is released when the pin is inserted. The latch could also be actuated by depressing a discrete side portion of the cap 83 (not shown) to actuate the lock plate and/or spring mechanism.

This invention is also a vehicle 14 with a vehicle interior 12 having a rear cargo area 18 flanked by a pair of side supports 90, 92. The side supports have a plurality of load floor positions 94, 96, 98, 100 which receive and support projections 102, 104 on the load floor 22. The load floor 22 may be positioned between load floor positions 94, 98 for a top position and between load positions 96, 100 for an intermediate position. Handle 24 on the load floor may be used for this purpose. The bottom position is shown in FIGS. 1–3 with the load floor 22 supported directly on the cargo bed 20. Tracks 110, 112 are located in the vehicle interior 12 forward of the load floor 22. The tracks support the forward and rearward movement of the seat. With the load floor in its bottom position the seat 16 is movable forwardly and rearwardly on the tracks 110, 112. This movement changes a gap A between the seat 16 and the load floor 22 as shown in FIGS. 1 and 2. As gap A changes, the flipper panel 34 continues to bridge the gap in a gap-changing manner with respect to the load floor.

With reference to FIGS. 1 and 2, the seat support member 30 has the mounting tube or sleeve portion 80 of the rod housing 32 welded thereto. The rod retainer bushing portion 81 of the rod housing is attached to the sleeve portion and is movable with the seat support member 30. The flipper panel 34 includes a rod 36 which is pivotable with respect to the panel. Since the rod end 40 of the flipper panel 34 is insertable into the rod retainer bushing portion 81, the flipper panel moves forwardly and rearwardly with the seat support member 30.

The flipper panel 34 is pivotable on the bight portion 74 (FIG. 3) of the rod 36 between a discrete upright position adjacent the seat (FIG. 2 phantom) and a lowered position (FIGS. 1 and 2 solid) overlaying the load floor 22 whenever the seat support member 30 moves forwardly and rearwardly.

The load floor 22 may be formed with blow-molded hollow compartments.

While the best mode for carrying out the invention has been described in detail, those familiar with the art to which this invention relates will recognize various alternative designs and embodiments for practicing the invention within the scope of the appended claims.

The invention claimed is:

1. A flipper panel system adapted for mounting in an interior compartment of a vehicle behind a seat thereof, the vehicle having a load floor, and the flipper panel system comprising:
   a seat support member movable between forward and rearward gap-forming positions which respect to the load floor;
   a rod housing movable with said seat support member; and
   a flipper panel having a rod pivotable with respect to said panel, said rod being insertable into said rod housing for supporting said panel, and said panel being movable after said rod is inserted for pivotable movement between a bridging cover position covering said gap in both of said gap-forming positions and a storage position adjacent said seat.

2. The flipper panel system of claim 1 wherein said rod is U-shaped and includes four flat detent surfaces at at least one location to accept at said one location a U-shaped spring for cooperating selectively with the flat surfaces on the rod in holding said panel in a selected one of the cover and storage positions.

3. The flipper panel system of claim 2 wherein the flipper panel in said storage position is upright at an angle predetermined by at least one of said flat surfaces.

4. The flipper panel system of claim 1 being further adapted for mounting in an interior compartment wherein the seat has a headrest mounted in a rod housing, and wherein said rod housing movable with said seat is substantially interchangeable with the rod housing for the headrest in the seat.

5. The flipper panel system of claim 2 wherein said panel is a load bearing blow molded hard panel having a channel in the forward end of said panel to receive a bight portion of the U-shaped rod.

6. The flipper panel system of claim 1, wherein said panel in said cover position is higher at its forward end than at its rearward end, whereby to provide a slope to help a load on the load floor to move up on said panel.

7. The flipper panel system of claim 1 wherein at least a portion of said rod housing is weldable to the seat support member and in cooperation with said rod includes a latch operable to restrain and release said rod after said rod is inserted into said rod housing.

8. The flipper panel system of claim 1, wherein said panel has outboard wings to increase the gap covering when said panel is pivotably moved to said bridging cover position.

9. A motor vehicle interior having a rear cargo area flanked by a plurality of side support positions and comprising:
   a load floor supportable at a selected one of said support positions;
   a track in said vehicle interior forward of said load floor in the selected one of said support positions;
   a seat including a seat support structure movable forwardly and rearwardly on said track in a gap-changing manner with respect to said load floor;
   said seat support structure having a mounting tube and a rod retainer bushing movable with the seat support structure; and
   a flipper panel including a rod pivotable with respect to said panel and insertable into said rod retainer bushing so that said flipper panel moves forwardly and rearwardly with said seat support structure;
   said flipper panel being pivotable on said rod between a discrete upright position adjacent said seat and a lowered position overlaying said load floor when said seat support structure moves forwardly and rearwardly.

10. The motor vehicle of claim 9 wherein said load floor is formed with blow-molded hollow compartments.

11. A flipper panel system adapted for mounting in an interior compartment of a vehicle behind a seat thereof, the vehicle having a load floor, and the flipper panel system comprising:
   a seat support member movable between forward and rearward gap-forming positions which respect to the load floor;
   a rod housing movable with said seat support member; and
   a flipper panel having a rod pivotable with respect to said panel, said rod being insertable into said rod housing for supporting said panel, and said panel being movable after said rod is inserted for pivotable movement between a bridging cover position covering said gap in both of said gap-forming positions and a storage position adjacent said seat;
   wherein said rod is U-shaped and includes four flat detent surfaces at at least one location to accept at said one location a U-shaped spring for cooperating selectively with the flat surfaces on the rod in holding said panel in a selected one of the cover and storage positions; and wherein said flipper panel in said storage position is upright at an angle predetermined by at least one of said flat surfaces.

* * * * *